T. Tripp,

Fire Annihilator.

No. 106,517. Patented Aug. 16, 1870.

UNITED STATES PATENT OFFICE.

THOMAS TRIPP, OF CHICAGO, ILLINOIS.

IMPROVEMENT IN FIRE-EXTINGUISHERS.

Specification forming part of Letters Patent No. 106,517, dated August 16, 1870.

*To all whom it may concern:*

Be it known that I, THOMAS TRIPP, of Chicago, in the county of Cook and State of Illinois, have invented a new and useful Machine for Using Chemicals for Extinguishing Fires; and I do hereby declare the following to be a full, clear, and exact description thereof, which will enable others skilled in the art to which my invention appertains to make and use the same, reference being had to the accompanying drawing, forming part of this specification.

Figure 2:
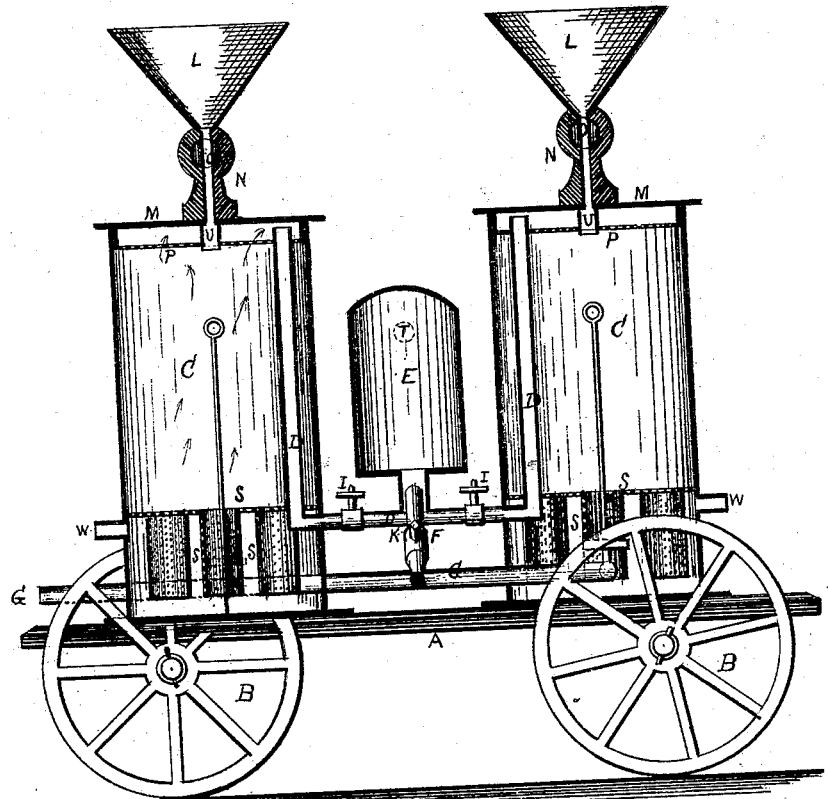
Figure 1:
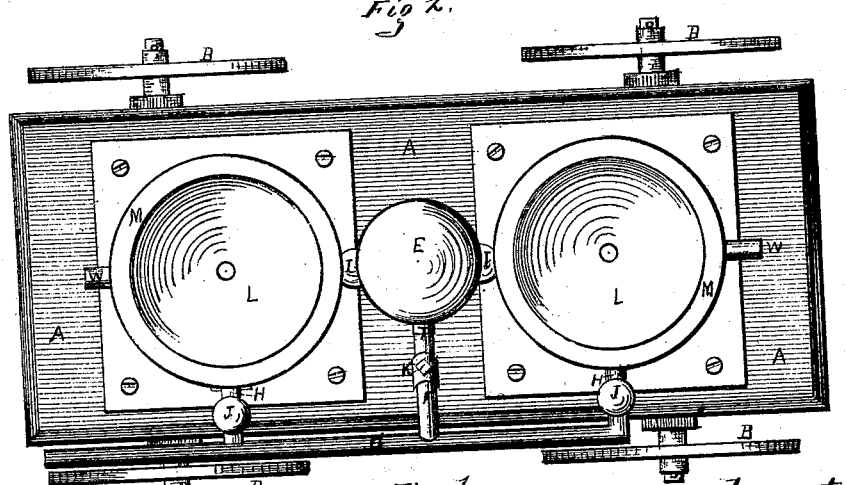

Figure 1 is a top-plan view of my improved machine. Fig. 2 is a vertical section in the line $x\ x$, Fig. 1.

Similar letters of reference indicate corresponding parts in the several figures of the drawing.

Sulphite of soda has been found to possess the requisite qualities for extinguishing fires, and has been applied in water to that purpose. Much difficulty has, however, been found in the production of proper means for mixing this chemical with water to render its use practicable and economical.

My invention has for its object to overcome this objection; and it consists in arranging two or more cylinders adapted to receive the chemicals in upright positions upon a suitable platform or truck, for the purpose of permitting the passage of water upward through a large body of chemicals before being discharged upon a fire.

It consists, secondly, in the combination, with one or more receptacles in which the chemicals are saturated with water, of a receiver or chamber for mixing clear water with a solution of chemicals, for the purpose of regulating the strength of the latter.

In consists, thirdly, in the application of steam as a dissolvent for the chemicals contained in the chemical-receiving cylinders.

It consists, lastly, in the combination and arrangement of various parts of the machine, as will be hereinafter more fully described.

In the accompanying drawing, A is a platform suitably mounted upon wheels B. C C are two upright cylinders mounted upon the platform a short distance apart. D is a bent pipe, connecting the two cylinders near their base, and rising eccentrically within each nearly to the top. Supported between the cylinders upon the pipe D, and communicating therewith, is a small cylindrical drum, E, connected by a lateral pipe, F, with the main water-supply pipe G. This latter pipe extends longitudinally of the platform A, and communicates with the base of the main cylinders C by means of short pipes or tubes H. (Shown clearly in Fig. 1.)

The pipe D is supplied with cocks I between the cylindrical drum and each of the main cylinders, and the pipes G and F are provided, respectively, with way-cocks J K. L L are funnels or hoppers supported upon the covers M of the main cylinders by means of short tubes N, each of which is provided with way-cocks O, to open or close communication between the funnels and interior of the cylinders. Affixed to the under side of the covers, or supported upon lugs at the upper end of the cylinders, are perforated plates or diaphragms P. These diaphragms should extend slightly below the upper ends of the pipe D, as shown in Fig. 2.

The operation is as follows: The cylinders C C are filled or partially filled with sulphite of soda, either placed directly upon the bottom of the cylinders or supported upon removable perforated brackets S. The end of the water-supply pipe G is then attached, in any convenient manner, either to a fire-plug, hydrant, or fire-engine, and the cocks J opened to admit the water to the cylinders, the cock K being closed to shut off communication between the pipe G and the cylindrical drum. The water entering the cylinders rises through the chemicals, and then passes through the pipe D into the cylindrical drum, (the cock I being first opened,) from which it is discharged upon a fire by any suitable pipe or hose applied to the short tube T, near the top of the drum. By this arrangement the water passes upward through a large body of chemicals, and becomes perfectly impregnated with the same before passing to the drum E.

The perforated diaphragms P permit the flow of water, but prevent the passage of the chemicals to the ends of the tube D. Chemicals are supplied to the cylinders from the funnels L by opening the way-cocks O, as will be readily understood; and in order to prevent the chemicals so supplied from being carried by the water above the diaphragm into the tubes D, a short tube, U, is attached to the under side of each cover M, in line with the tubes N, and extending within the cylinders below the perforated diaphragm. By this arrangement the chemicals are discharged into the cylinders below the diaphragms.

Steam may be admitted to the cylinders through pipes W, to assist or increase the dissolution of the chemicals. When it is desired to mix a certain percentage of pure water with that saturated with the chemicals, the cock in the pipe F is opened to admit the water directly from the pipe G to the receiver, where it is mixed with that already saturated. The water may also be passed through the chemicals in but one cylinder by closing the set of cocks, I J, belonging to the other, and may also be mixed in the receiving-drum with uncharged or clear water, if desired.

The cylinders may be charged with chemicals while the machine is in operation by closing one of the cocks I and J, to shut off the passage of water through one cylinder. The chemicals are then discharged into the cylinder by opening the way-cock O, as previously mentioned. In this manner one cylinder is kept in operation while the other is being charged. By closing all the cocks with the exception of that in the pipe F, the machine is made to discharge clear water through the cylinder-drum.

Having thus described my invention, what I claim as new, and desire to secure by Letters Patent, is—

1. Two or more cylinders for receiving chemicals to be saturated with water for extinguishing fires, arranged in upright positions upon a suitable platform or truck, for the purpose of permitting the passage of water upward through the chemicals before being discharged upon a fire, substantially as herein shown and described.

2. In combination with one or more receptacles for saturating water with chemicals, a receiver or chamber for mixing clear water with a solution of chemicals, substantially as described, for the purpose specified.

3. In a machine for saturating water with chemicals for extinguishing fires, the application of steam to the chemical-receiving cylinders, for the purpose of increasing the dissolution of said chemicals, as herein shown and described.

4. The combination of the receiver E and pipe D with the upright cylinders C, for the purpose specified.

5. The perforated diaphragms P, in combination with the cylinders C and bent pipe D, for the purpose specified.

6. The perforated baskets S, adapted for insertion within the cylinders, to receive and hold the chemicals to be saturated, substantially as herein shown and described.

7. The arrangement for charging the cylinders with chemicals while the machine is in operation, as herein shown and described.

8. The arrangement of the pipes G, H, F, and D with relation to the cylinders C and receiving chamber or drum E, as herein shown and described.

THOS. TRIPP.

Witnesses:
G. H. FROST,
O. E. WOODBURY.